(12) United States Patent
Kobayashi

(10) Patent No.: US 7,915,519 B2
(45) Date of Patent: Mar. 29, 2011

(54) SOLAR BATTERY MODULE FRAME BODY

(75) Inventor: Shuichi Kobayashi, Takahama (JP)

(73) Assignee: Yanegijutsukenkyujo Co. Ltd., Takahama, Aichi (JP)

( * ) Notice: Subject to any disclaimer, the term of this patent is extended or adjusted under 35 U.S.C. 154(b) by 805 days.

(21) Appl. No.: 11/536,000

(22) Filed: Sep. 28, 2006

(65) Prior Publication Data

US 2007/0131273 A1 Jun. 14, 2007

(30) Foreign Application Priority Data

Dec. 13, 2005 (JP) ................... 2005-358534

(51) Int. Cl.
*H01L 31/042* (2006.01)
*F24J 2/46* (2006.01)
*E04D 13/18* (2006.01)

(52) U.S. Cl. ........ 136/251; 136/244; 126/623; 126/704; 52/173.3

(58) Field of Classification Search ............. 136/251, 136/244, 291; 52/173.3; 126/623, 704
See application file for complete search history.

(56) References Cited

U.S. PATENT DOCUMENTS

| 6,105,317 | A * | 8/2000 | Tomiuchi et al. ............ 52/173.3 |
| 2003/0070368 | A1 | 4/2003 | Shingleton |
| 2004/0163338 | A1 | 8/2004 | Liebendorfer |
| 2004/0221524 | A1 | 11/2004 | Poddany et al. |

FOREIGN PATENT DOCUMENTS

| JP | 09-167852 | | 6/1997 |
| JP | 10-169132 | | 6/1998 |
| JP | 2001-144314 | * | 5/2001 |
| JP | 2003-056131 | | 2/2003 |
| JP | 2003-124493 | | 4/2003 |
| JP | 2003-336357 | A | 11/2003 |
| JP | 2000-297509 | | 10/2006 |
| WO | 03/007688 | A2 | 1/2003 |

OTHER PUBLICATIONS

JP2001-144314 Machine Translation, Nakamura, May 2001.*

* cited by examiner

*Primary Examiner* — Jeffrey T Barton
*Assistant Examiner* — Devina Pillay
(74) *Attorney, Agent, or Firm* — Apex Juris, PLLC; Tracy M Heims

(57) ABSTRACT

A fixing member (3, 40, 43, 50, 53) which fixes a first frame body (1) of a solar battery module main body (9) slides along the first frame body, and the solar battery module main body includes a connecting portion (10) and a to-be connected portion (11) which connects the first frame bodies which are adjacent to each other through the fixing member. With this, a position of the fixing member can freely be moved with respect to the first frame body, the fixing member is slid to a position where there is a structure member (32) which supports a roofboard at predetermined intervals, and the fixing member is mounted at that position. With this, the fixing member can be mounted more strongly, and the adjacent two first frame bodies (31) can be fixed by the fixing member.

5 Claims, 8 Drawing Sheets

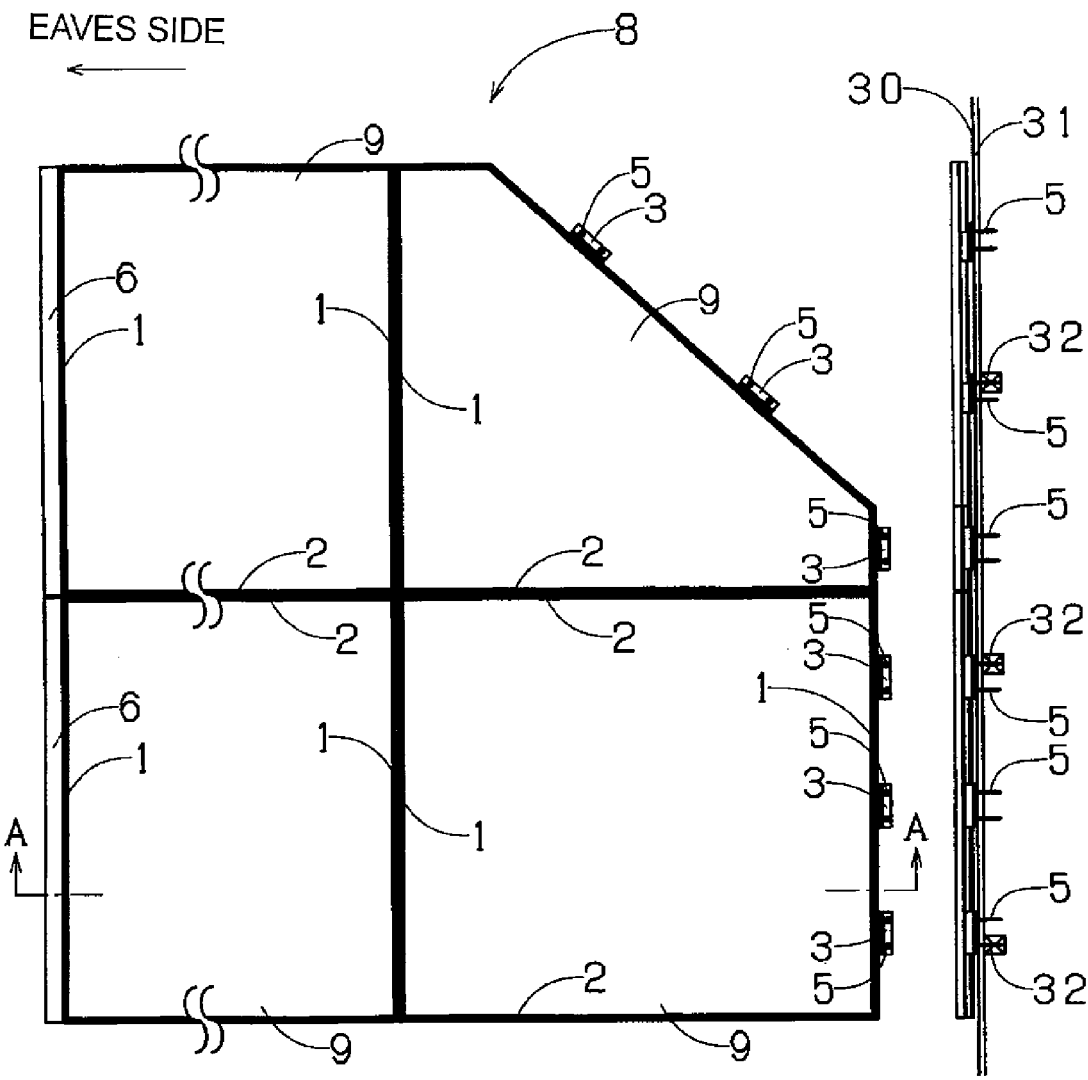
FIG. 1A
FIG. 1C
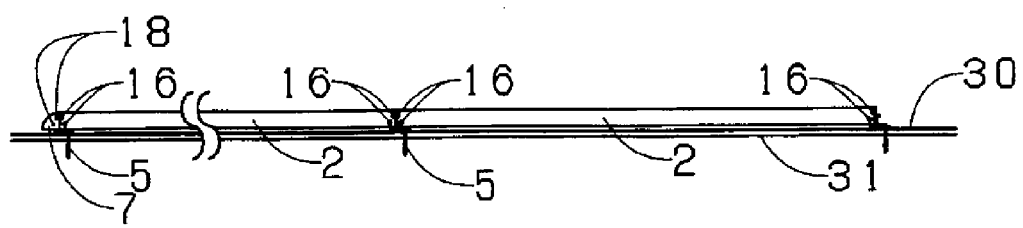
FIG. 1B

FIG. 4
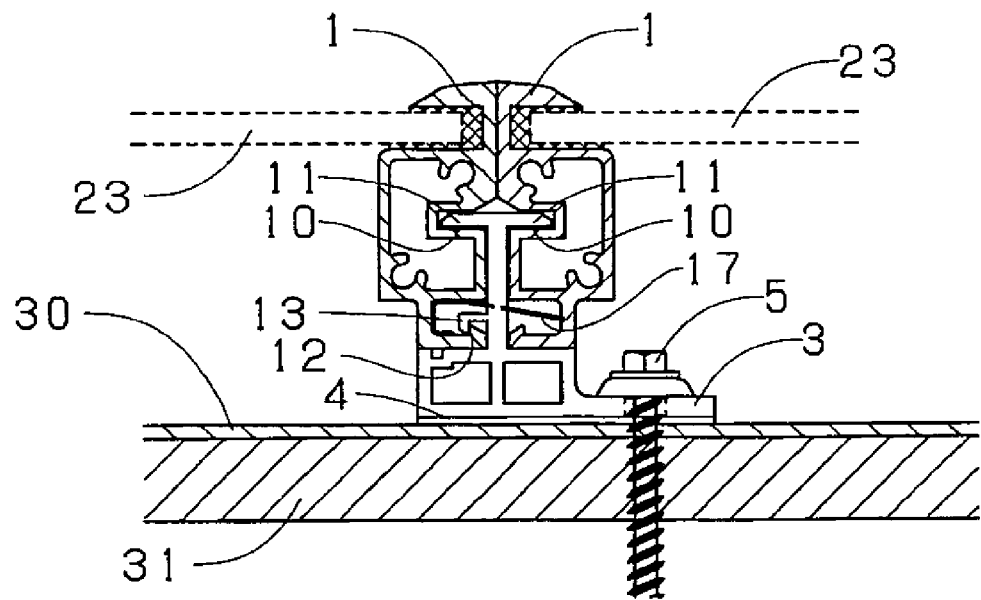
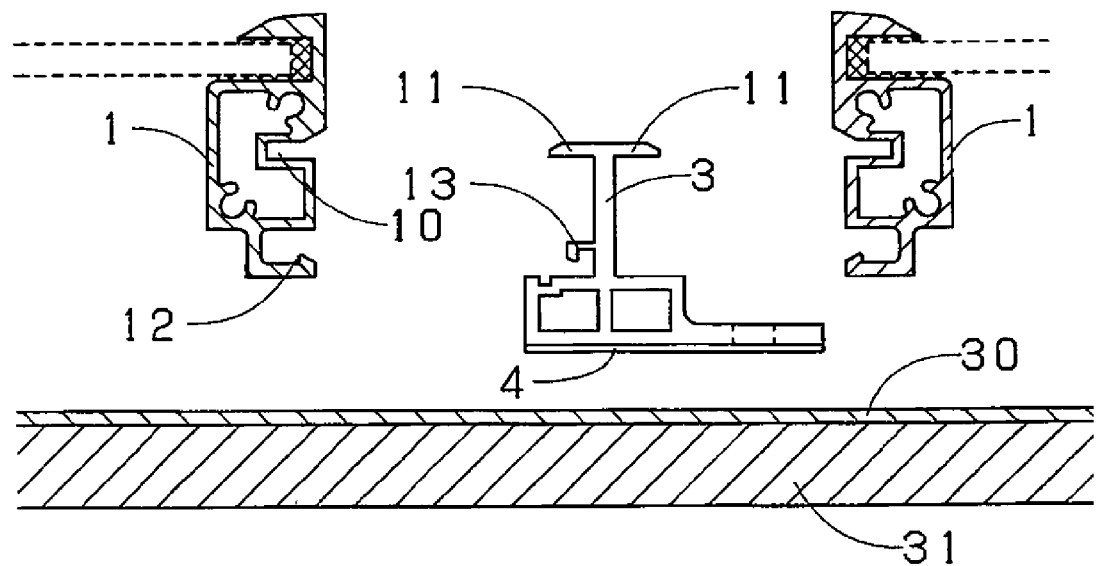
FIG. 5

FIG. 6
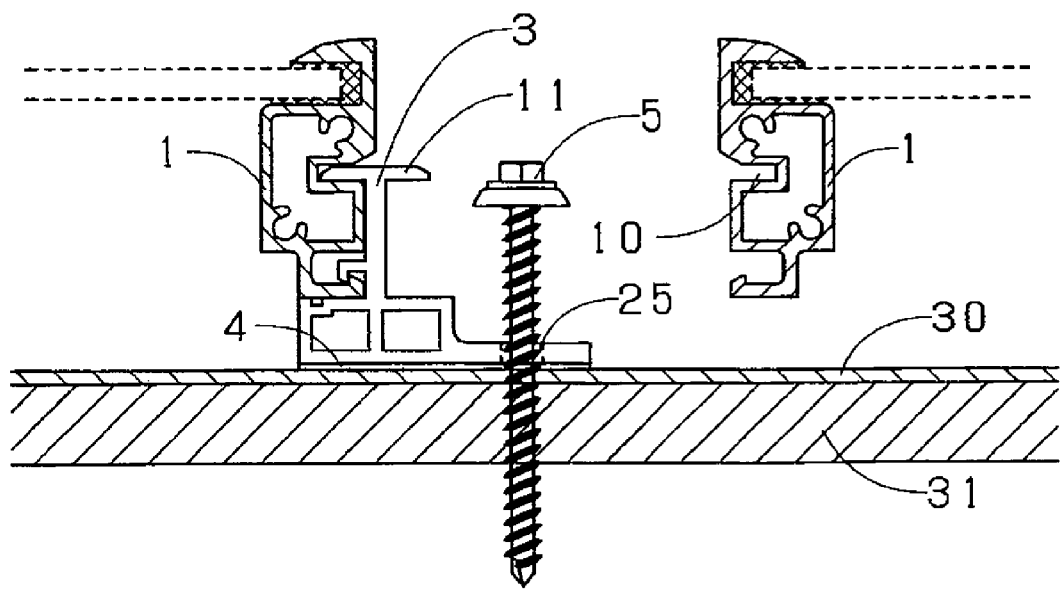
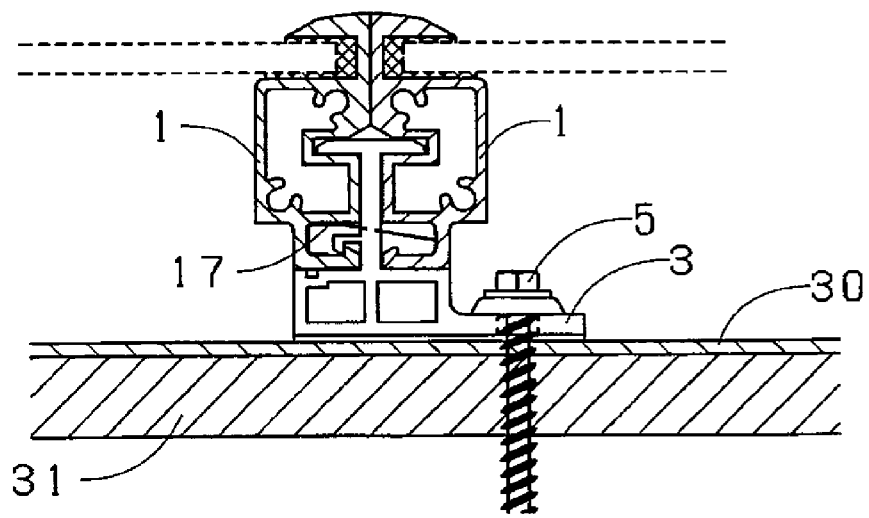
FIG. 7

FIG. 10   "Prior Art"
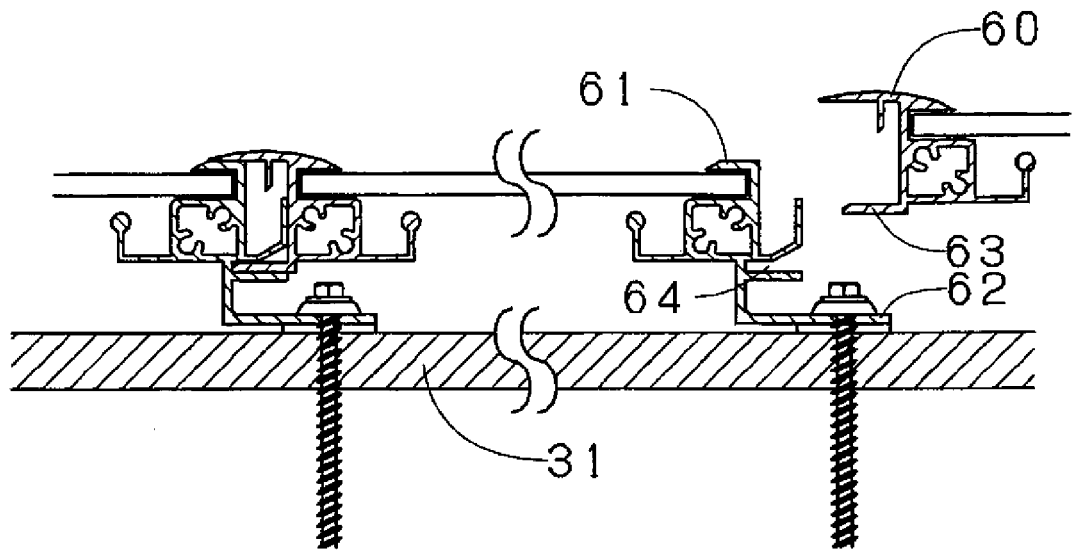
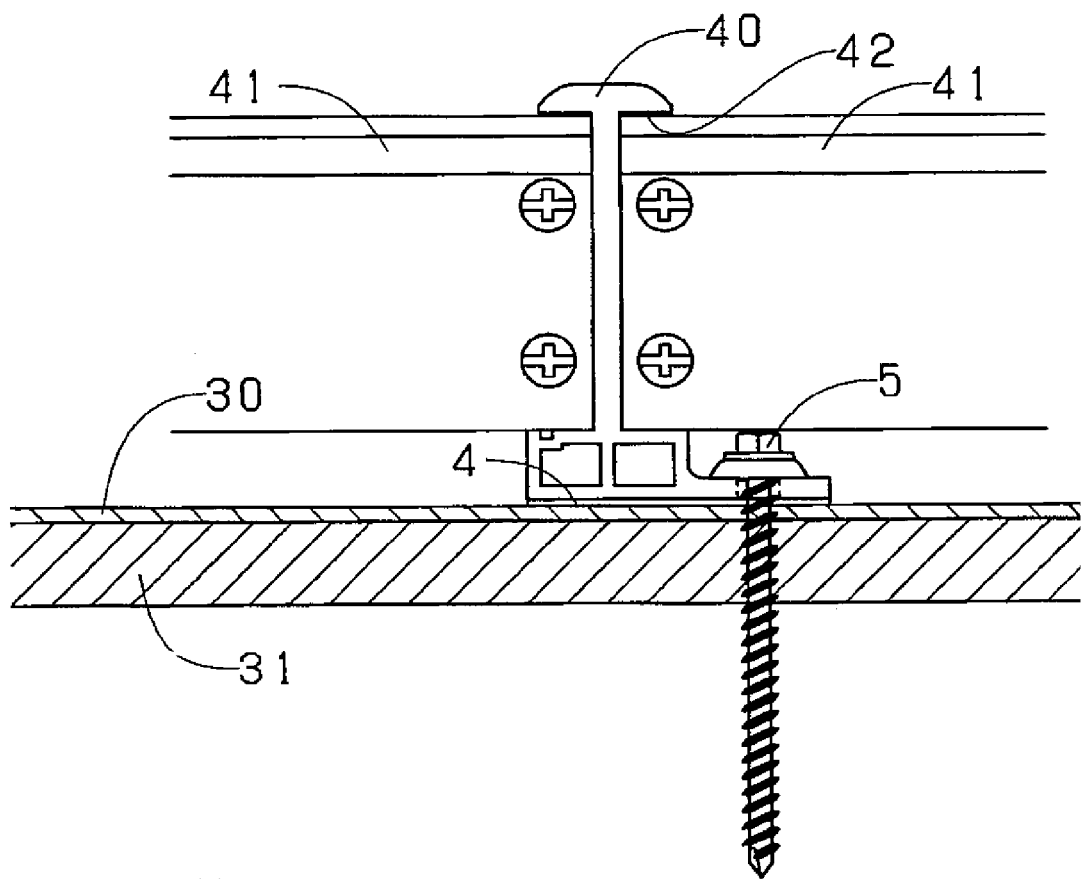
FIG. 11

FIG. 14
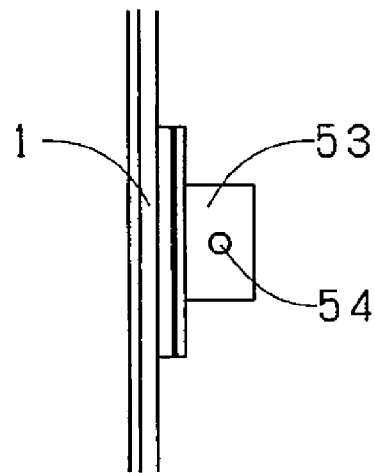
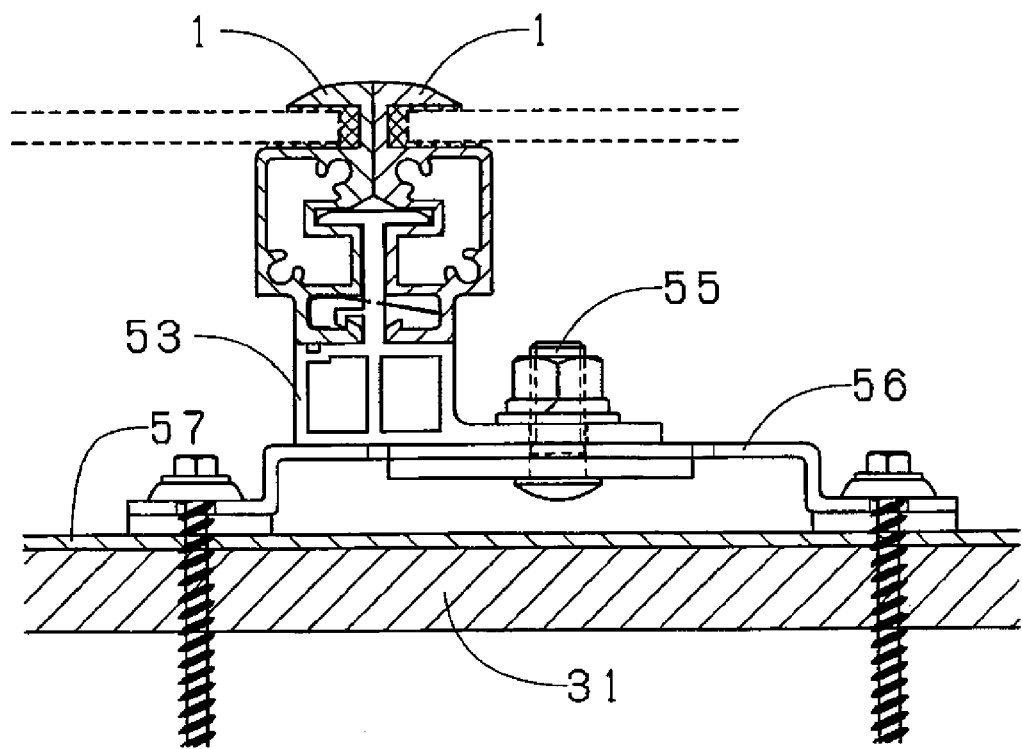
FIG. 15

SOLAR BATTERY MODULE FRAME BODY

BACKGROUND OF THE INVENTION

1. Field of the Invention

The present invention relates to a solar battery module frame body.

2. Background of the Invention

A conventional solar battery module can be mounted directly on a roofboard without through a roofing. As shown in FIG. 10, of frame bodies of two solar battery modules which are adjacent in a flowing direction and a vertical direction, a joint portion 62 formed on a ridge-side frame body 61 of an eaves-side solar battery module is connected to a roofboard 31, and a ridge-side fitting portion 64 formed on a ridge-side frame body 61 of an eaves-side solar battery module is fitted into an eaves-side fitting portion 63 formed on an eaves-side frame body 60 of a ridge-side solar battery module. This conventional solar battery module is disclosed in the Japanese Patent Application Laid-open No. 2000-297509.

However, the conventional solar battery module is integrally provided with joint portions 62 for mounting a frame body thereof on the roofboard 31. Therefore, a position where rafters which support the roofboard 31 at predetermined intervals and a position of the joint portion 62 of the solar battery module are not aligned with each other in some cases, and there are problems that the joint portion 62 is not fixed to the rafter and that the fixing strength of the solar battery module is deteriorated.

The eaves-side frame body 60 and the ridge-side frame body 61 of the solar battery module have different shapes, complicated machining operation is required for forming the joint portion 62, and they increase the cost.

Hence, to solve the problem of the conventional solar battery module, it is an object of the present invention to provide a solar battery module frame body capable of sliding a fixing member, and capable of reducing the number of parts of the frame body of the solar battery module, thereby reducing cost.

SUMMARY OF THE INVENTION

A solar battery module frame body according to the present invention is characteristic in that it comprises a polygonal solar battery panel main body, first frame bodies each supporting a side extending in a predetermined direction of the solar battery panel main body, a fixing member which slides along the first frame body and which is fixed to a predetermined support member, and connecting means which connects the first frame bodies which are adjacent to each other through the fixing member.

According to the solar battery module frame body of the invention, the fixing member fixes the first frame body which supports the side extending in the predetermined direction (lateral direction in a state where it is disposed for example) of the solar battery module main body, the fixing member slides along the first frame body, and the solar battery module frame body includes the connecting means which connects the first frame bodies which are adjacent to each other through the fixing member. With this, the position of the fixing member can freely be moved with respect to the first frame body. Therefore, when it is fixed to a roofboard of a roof as the support member, the fixing member can be slid to a position where there is a structure member such as a rafter which supports the roofboard at predetermined intervals, the fixing member is mounted at that position, the fixing member can be mounted more strongly, and the solar battery module can be fixed more strongly. Since the first frame bodies which are adjacent to each other through the fixing member are connected to each other by the connecting means, the adjacent two first frame bodies can be fixed by the fixing member, labor required for disposing the solar battery module can be reduced, and any solar battery module can be fixed to the support member.

The solar battery module frame body of the invention is characteristic in that it further comprises movement-restricting means which restricts a relative movement between the first frame body and the fixing member in a direction perpendicular to a sliding direction of the fixing member.

The solar battery module frame body of the invention further comprises the movement-restricting means which restricts the relative movement between the first frame body and the fixing member in a direction perpendicular to the sliding direction of the fixing member. With this, the fixing member can freely slide along the first frame body, but since the relative movement in the perpendicular direction can be restricted, the fixing member is mounted near a predetermined target position of the solar battery module, and when it is disposed the fixing member does not come out from the first frame body, the solar battery module can be fixed in this state, and labor required for disposing the solar battery module can be reduced.

The solar battery module frame body of the invention is characteristic in that the connecting means connects such that cross section shapes of the first frame bodies which are adjacent to each other are symmetric to each other.

According to the solar battery module frame body of the invention, the connecting means connects such that cross section shapes of the first frame bodies which are adjacent to each other are symmetric to each other. With this, the shape of the first frame body is symmetric with respect to the eaves side and ridge side and is the same, parts of the first frame body can commonly be used and molds of the first frame body can commonly be used, and cost of the solar battery module main body can be reduced.

The solar battery module frame body of the invention is characteristic in that the connecting means comprises a connecting portion formed on the first frame body, and a to-be connected portion formed on the fixing member.

The connecting means of the solar battery module frame body of the invention comprises the connecting portion formed on the first frame body, and the to-be connected portion formed on the fixing member. With this, the connecting portion of the first frame body and the to-be connected portion of the fixing member can connect the adjacent first frame bodies, and if the fixing member is fixed, any solar battery module can be fixed to the structure member. For example, as a shape of the connecting portion, there is a case where the connecting portion is concave in shape and the to-be connected portion is convex in shape, and a case where the connecting portion is convex in shape and the to-be connected portion is concave in shape.

Further, the solar battery module frame body of the invention is characteristic in that the movement-restricting means comprises an engaging portion formed on the first frame body, and a to-be engaged portion formed on the fixing member.

The movement-restricting means of the solar battery module frame body of the invention comprises an engaging portion formed on the first frame body, and a to-be engaged portion formed on the fixing member. Since the first frame body and the fixing member are engaged with each other by the engaging portion and the to-be engaged portion, the relative movement of in the direction perpendicular to the longitudinal direction of the first frame body can be restricted. As compared with the butt only, it is possible to prevent the solar battery module main body from coming out due to the engagement even when force acting in the direction opposite from the butt is applied. For example, when the engaging portion formed on the first frame body and the to-be engaged portion formed on the fixing member have pawl shapes and they are engaged resiliently, since they can be engaged at predetermined positions without inserting from the end surface of the first frame body, labor required for disposing the solar battery module can be reduced. When the engaging portion formed on the first frame body and the to-be engaged portion formed on the fixing member are engaged by the L-shapes, they are slid from the end surface of the first frame body and moved to predetermined positions, but they can be fixed more strongly as compared with the pawl shape.

In addition, the solar battery module frame body of the invention is characteristic in that a height of the fixing member can be adjusted by a height adjusting pedestal.

The height of the fixing member of the solar battery module frame body of the invention can be adjusted by the height adjusting pedestal. With this, a module cable required between the solar battery modules can be connected to each other between upper and lower portions and between left and right sides, and labor required for disposing the solar battery module can be reduced. By adjusting the height of the fixing member, harmony with periphery of the solar battery module is enhanced and a beautiful outward appearance is not deteriorated. Ventilation can be secured at the lower portion of the solar battery module frame body, and it is possible to prevent the power generating efficiency from being deteriorated by the temperature rise of the solar battery module.

In addition, the solar battery module frame body of the invention is characteristic in that it further comprises a second frame body which supports a side that is different from the side supported by the first frame body of the solar battery module main body.

The solar battery module frame body of the invention further comprises a second frame body which supports a side that is different from the side supported by the first frame body of the solar battery module main body. With this, the solar battery module can be formed into the polygonal shape, and since the shape of the second frame body is symmetric, the left and right parts of the second frame body can commonly be used, and molds of the second frame body can commonly be used, and cost of the solar battery module main body can be reduced.

According to the present invention, it is possible to provide a solar battery module frame body capable of sliding a fixing member thereof, the number of parts of the frame body of the solar battery module, thereby reducing cost.

BRIEF DESCRIPTION OF THE DRAWINGS

The above and other objects of the present invention will become readily apparent by reference to the following detailed description when considered in conjunction with the accompanying drawings wherein:

FIG. 1A is a schematic plan view showing a state where a solar battery module frame body of an embodiment of the present invention is disposed, FIG. 1B is a right side view of FIG. 1A and FIG. 1C is a rear view of FIG. 1A;

FIG. 4 is a sectional view showing a portion B in FIG. 2 in detail;

FIG. 5 is an enlarged view of an essential portion of the solar battery module frame body in FIG. 1 and is a schematic sectional view showing procedure;

FIG. 6 is a schematic sectional view of procedure following the procedure shown in FIG. 5;

FIG. 7 is a schematic sectional view of procedure following the procedure shown in FIG. 6;

FIG. 10 is a sectional view used for explaining one example of a conventional solar battery module;

FIG. 11 is a sectional view used for explaining outline of another shape of a fixing member of the present invention;

FIG. 14 is a plan view used for explaining outline of another shape of a fixing member of the present invention; and FIG. 15 is a sectional view used for explaining FIG. 14 in detail.

DESCRIPTION OF THE PREFERRED EMBODIMENTS

Figure 2:
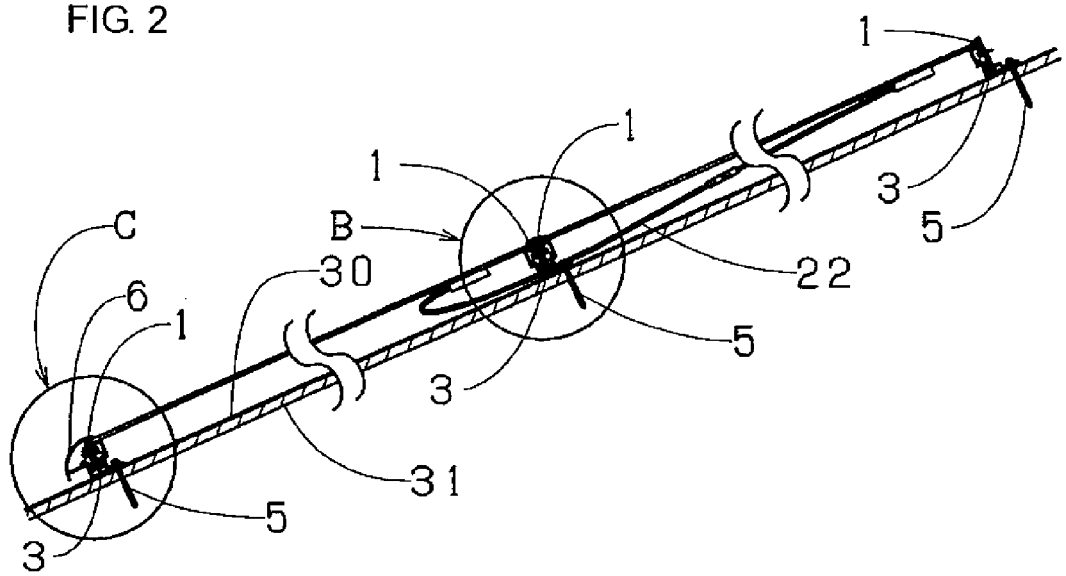
FIG. 2 is a sectional view used for explaining the portion of the line A-A in FIG. 1 in detail.
Figure 3:
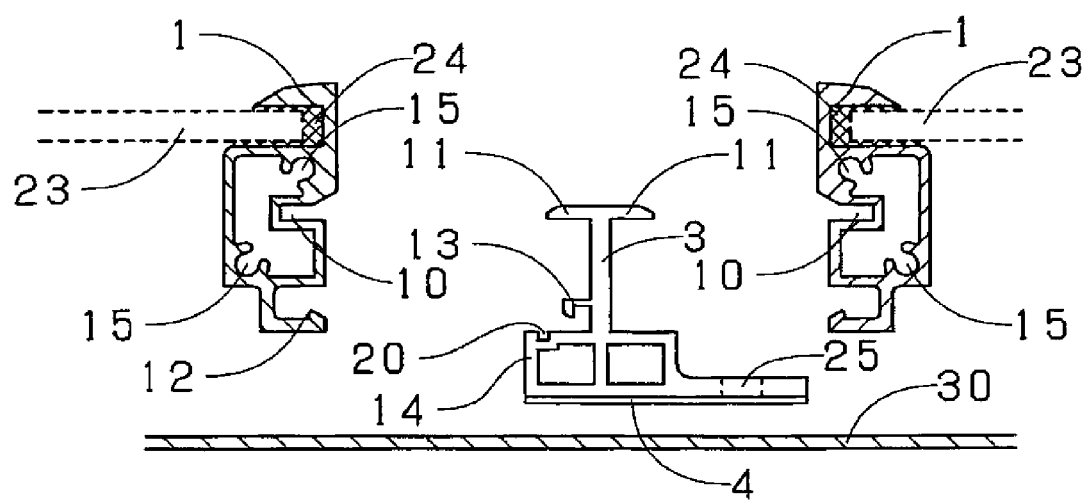
FIG. 3 is an exploded sectional view of various parts of the solar battery module frame body in FIG. 1.
Figure 8:
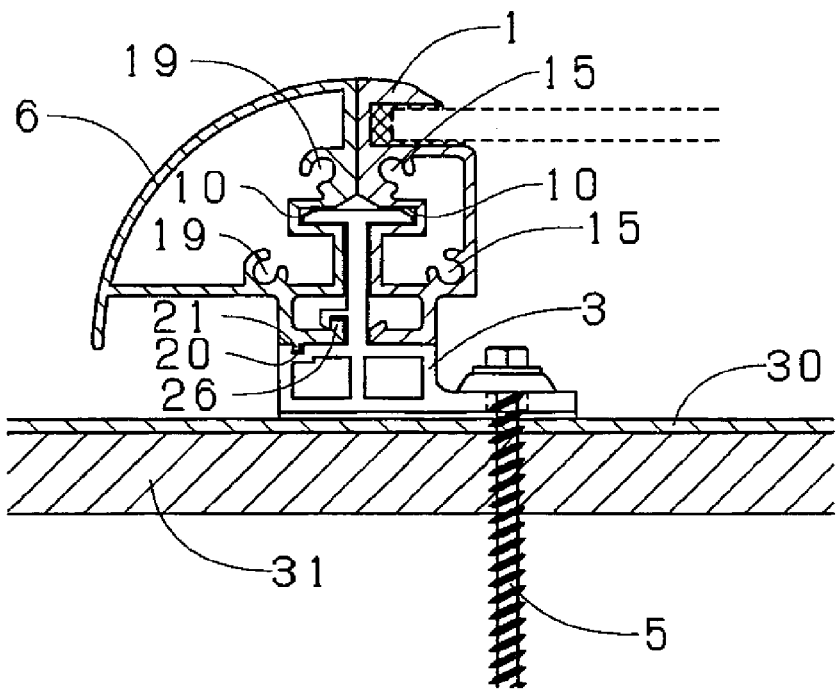
FIG. 8 is a sectional view used for explaining a portion C in FIG. 2 in detail.
Figure 9:
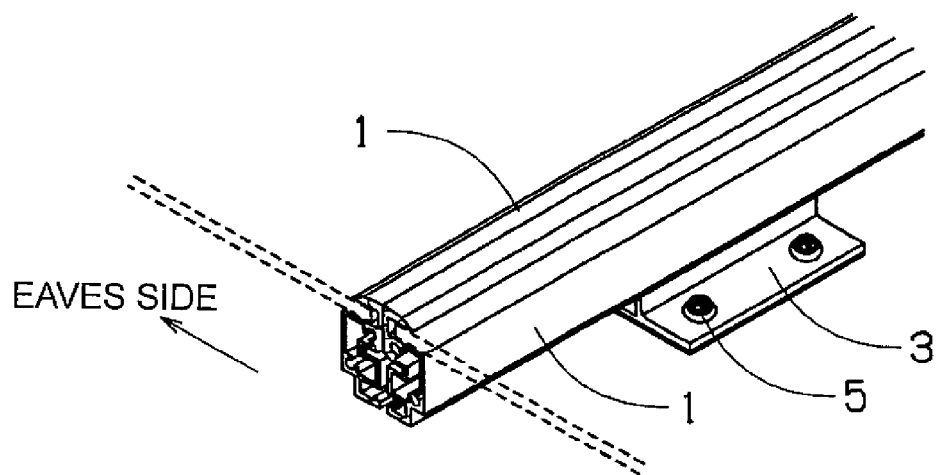
FIG. 9 is a plan view showing the portion B in FIG. 2.

A solar battery module frame body which is the best mode for carrying out the invention will be explained based on the drawings. FIG. 1A is a schematic plan view showing a state where a solar battery module frame body of an embodiment of the present invention is disposed, FIG. 1B is a right side view of FIG. 1A and FIG. 1C is a rear view of FIG. 1A. FIG. 2 is a sectional view used for explaining the portion of the line A-A in FIG. 1 in detail. FIG. 3 is an exploded sectional view of various parts of the solar battery module frame body in FIG. 1. FIG. 4 is a sectional view showing a portion B in FIG. 2 in detail. FIGS. 5 to 7 are enlarged views of an essential portion of the solar battery module frame body in FIG. 2 and are schematic sectional views showing procedure. FIG. 8 is a sectional view used for explaining a portion C in FIG. 2 in detail. FIG. 9 is a perspective view showing a portion B in FIG. 2.

As shown in FIG. 1, according to the solar battery module frame body of the embodiment, a first frame body 1 and a second frame body 2 form a polygonal solar battery module main body 9. A fixing member 3 is fixed to a ridge side of each of solar battery module main bodies 9 by a main body fixing screw 5. As shown in FIG. 1A, first frame bodies 1 and second frame bodies 2 are adjacent to each other, frontage dressed covers 6 can be disposed on the eaves side, and outward appearance can be taken into consideration. As shown in FIG. 1B, in the solar battery module main body 9, the first frame body 1 and the second frame body 2 intersect with each other perpendicularly to each other, and they are assembled by frame body fixing screws 16. The frontage dressed cover 6 is provided at its end surface with an end surface dressed cover 7 for enhancing the outward appearance, and the end surface dressed cover 7 can be fixed by an end surface dressed cover screw 18. As shown in FIG. 1C, the fixing member 3 slides along the first frame body 1, and structure members 32 (e.g., rafters) which supports the roofboard 31 at predetermined intervals can be fixed by main body fixing screws 5.

As shown in FIG. 2, a module cable 22 can be connected to each other between upper and lower portions and between left and right sides due to the height of the fixing member 3, ventilation can be secured at the lower portion of the solar battery module frame body, and it is possible to prevent the power generating efficiency from being deteriorated by the temperature rise of the solar battery module.

Next, the first frame bodies 1 will be explained based on FIG. 3. Here, a first frame body 1 (ridge side first frame body 1) shown on the left side in FIG. 3 will be explained. Another first frame body 1 (eaves side first frame body 1) shown on the right side in FIG. 3 has a shape which is laterally symmetric, detailed explanation thereof will be omitted. As shown in FIG. 3, the cross sectional shape of the first frame body 1 is vertically long rectangular shape, a portion thereof exceeding a U-shaped rectangular central portion is recessed toward an inner side of the rectangular shape from the outer side of the frame body around the center of the right side, an intersection between U-shaped upper and right sides has one chamfered connecting portion 10, and two frame body fixing screw holes 15 are formed in two locations of the rectangular shape, i.e., on a diagonal line and a corner thereof. Further, a right side of the rectangular shape extending downward from a slightly left side from the center of the bottom side has an L-shaped engaging portion 12 having an opening. A left side of the rectangular shape extending straightly upward from an upper portion of the right side of the rectangular shape is formed with an L-shape having an opening. A module glass 23 having solar battery cells which are necessary to generating power can be sandwiched in the L-shape from the left side while keeping the waterproof by spumous EPDM (ethylene propylene diene methylene) resin 24. A material of the first frame body 1 is an aluminum extrusion material, and its color is black.

Each of the fixing members 3 has a laterally long rectangular shape, and a vertical cross piece is provided, as a reinforcing member, at the center between upper and bottom sides inside of the rectangular shape. Since a vertical side and the center reinforcing side of the rectangular shape can adjust the height as a height adjusting pedestal 14, the height of the solar battery module main body 9 can be adjusted. Two main body fixing screw holes 25 are formed in depth direction in an extension extending from the bottom side to the right side of the rectangular shape for fixing the fixing member 3. Further, a T-shape having an axis extending upward from the center of the upper side of the rectangular shape is provided, and there are to-be connected portions 11 on side extending in both sides of the upper side of the T-shape. There is an L-shaped to-be engaged portion 13 provided at it slower side with an opening on slightly lower side and left side from the center of the vertical side of the T-shape. There is a recessed frontage dressed cover recess 20 at a location on slightly inner side from the left side of the upper side of the rectangular shape. A material of the fixing member 3 is aluminum extrusion material or stainless steel, and its color is silver.

There is a cutoff rubber 4 at the bottom of the fixing member 3. The cutoff rubber 4 prevents rain from leaking from the main body fixing screw 5. Further, there is effect that pits and projections on the surface of the roof are absorbed. A material of the cutoff rubber 4 is butyl rubber, and its color is black.

As shown in FIG. 4, the solar battery module frame body according to the embodiment of the invention is assembled. Each of the first frames body 1 is vertically symmetric, and they are opposed to each other. The opposed first frame bodies 1 are fixed by the fixing member 3, and the fixing member 3 is fixed on a roofing 30. The roofing 30 has both waterproof function and fire protection function.

FIGS. 5 to 7 are enlarged views of an essential portion of the solar battery module frame body in FIG. 2 and are schematic sectional views showing the procedure. First, as shown in FIG. 5, the fixing member 3 is disposed at a location corresponding to a target predetermined position where the fixing member 3 is to be retained, and the eaves-side to-be connected portion 11 of the fixing member 3 and the connecting portion 10 of the ridge-side first frame body 1 of the eaves-side solar battery module are connected to each other. The engaging portion 12 of the ridge-side first frame body 1 and the to-be engaged portion 13 of the fixing member 3 are engaged with each other.

Next, as shown in FIG. 6, the fixing members 3 are allowed to slide to positions of at least two or more structure members 32 with respect to the solar battery module main body 9, the remaining fixing members 3 are allowed to slide to such positions that force is applied to the solar battery module main body 9 substantially equally and the remaining fixing members 3 are placed on the roofing 30 and are fixed by the main body fixing screws 5. The main body fixing screw 5 can keep the fixing strength by the roofboard 31 and the structure member 32.

As shown in FIG. 7, since grounding is required between the solar battery modules, at least one grounding hardware 17 is disposed for a side to which the first frame body 1 is opposed. The grounding hardware 17 can electrically grounded by damaging an alumite layer of an aluminum material of the surface of the first frame body 1 by repulsion when first the frame bodies 1 are joined to each other by means of stainless material having strong resilient properties. After the fixing member 3 is fixed by the fixing screw 5, the grounding hardware 17 is engaged with the L-shaped engaging portion 12 having the opening of the eaves-side solar battery module main body 9 and is connected by the connecting portion 10 of the eaves-side first frame body 1 of the ridge-side solar battery module and the to-be connected portion 11 of the fixing member 3.

As shown in FIG. 8, a frontage dressed cover 6 which enhances the outward appearance can be disposed on the side of the frontage of the solar battery module array 8. The shape of the frontage dressed cover 6 is a one-fourth circle provided at its eaves side with R, and there is an L-shaped engaging portion 26 having an opening on the right side which extends downward from a slightly right side from the center of the bottom side of he one-fourth circle. The connecting portion 10 and an end surface dressed cover screw hole 19 are located at positions which are symmetric to the connecting portion 10 of the first frame body 1 and the frame body fixing screw hole 15. An R-member extends downward, and its length can be adjusted by dressing or rain-preventing member. A material of the R-member is aluminum extrusion material and its color is black.

As shown in FIG. 9, a length of the fixing member 3 in a direction parallel to the first frame body 1 is short, but the fixing member 3 can freely slide along the first frame body 1. The fixing member 3 is fixed using two main body fixing screws 5.

According to the solar battery module frame body of the embodiment, the position of the fixing member 3 can freely be moved with respect to the first frame body 1. Therefore, when the fixing member 3 is fixed to the roofboard 31 of the roof, the fixing member 3 is slid to a position where there is the structure member 32 such as the rafter which supports the roofboard 31 at predetermined intervals, the fixing member 3 is mounted at that position, the fixing member 3 can be mounted more strongly, and the solar battery module can be fixed more strongly. Since the first frame bodies 1 which are adjacent to each other through the fixing member 3 are connected to each other by the connecting portion 10 and the to-be connected portion 11, the adjacent two first frame bodies 1 can be fixed by the fixing member 3, the labor required for disposing the solar battery module can be reduced, and any solar battery module can be fixed to a roof.

Further, according to the solar battery module frame body of the embodiment, the shape of the first frame body 1 is symmetric with respect to the eaves side and ridge side and is the same, parts of the first frame body 1 can commonly be used and molds of the first frame body 1 can commonly be used, and cost of the solar battery module main body 9 can be reduced.

Further, according to the solar battery module frame body of the embodiment, the connecting portion 10 of the first frame body 1 and the to-be connected portion 11 of the fixing member 3 can connect the first frame bodies 1 which are adjacently disposed, and the fixing member 3 is fixed. With this, any solar battery module can be fixed to the structure member 32 (e.g., rafter). For example, as the shape of the connecting portion, there are a case where the connecting portion 10 is concave in shape and the to-be connected portion 11 is convex in shape, and a case where the connecting portion 10 is convex in shape and the to-be connected portion 11 is concave in shape.

Further, since the solar battery module frame body of the embodiment is engaged by the engaging portion 12 formed on the first frame body 1 and the to-be engaged portion 13 formed on the fixing member 3, the relative movement in a direction perpendicular to the longitudinal direction of the first frame body 1 can be restricted. As compared with the butt only, it is possible to prevent the solar battery module main body 9 from coming out due to the engagement even when force acting in the direction opposite from the butt is applied. For example, when the engaging portion 12 formed on the first frame body 1 and the to-be engaged portion 13 formed on the fixing member 3 have pawl shapes and they are engaged resiliently, since they can be engaged at predetermined positions without inserting from the end surface of the first frame body 1, labor required for disposing the solar battery module can be reduced. When the engaging portion 12 formed on the first frame body 1 and the to-be engaged portion 13 formed on the fixing member 3 are engaged by the L-shapes, they are slid from the end surface of the first frame body 1 and moved to predetermined positions, but they can be fixed more strongly as compared with the pawl shape.

Although the present invention has been explained based on the preferred embodiments, the invention is not limited to these embodiments, and the invention can variously be modified and design can be changed within a range not departing from the subject matter of the invention as shown below.

That is, although the first frame body 1 and the fixing member 3 have the engaging portion 12 and the to-be engaged portion 13 in the embodiment, a fixing member 40 as shown in FIG. 11 may be used. With this, as shown in FIG. 11, in the conventional solar battery module 41 having no engaging portion, the solar battery module has a connection portion 42 which connects the solar battery modules 41 which are adjacent to each other through the fixing member 40. Therefore, the solar battery module 41 can be disposed in a building. Further, the position of the fixing member 40 can freely be moved with respect to the solar battery module 41, the fixing member 40 can be slid to a position where there is the structure member 32 which supports the roofboard 31 at predetermined intervals, and the fixing member 40 can be mounted at that position.

The fixing member 40 has such a shape that the length of a T-shape of the fixing member 3 is adjusted so that the conventional solar battery module 41 can be sandwiched, and the fixing member 40 has a connecting portion 42. A material of the fixing member 40 is an aluminum extrusion material, and its color is silver.

Figure 12:
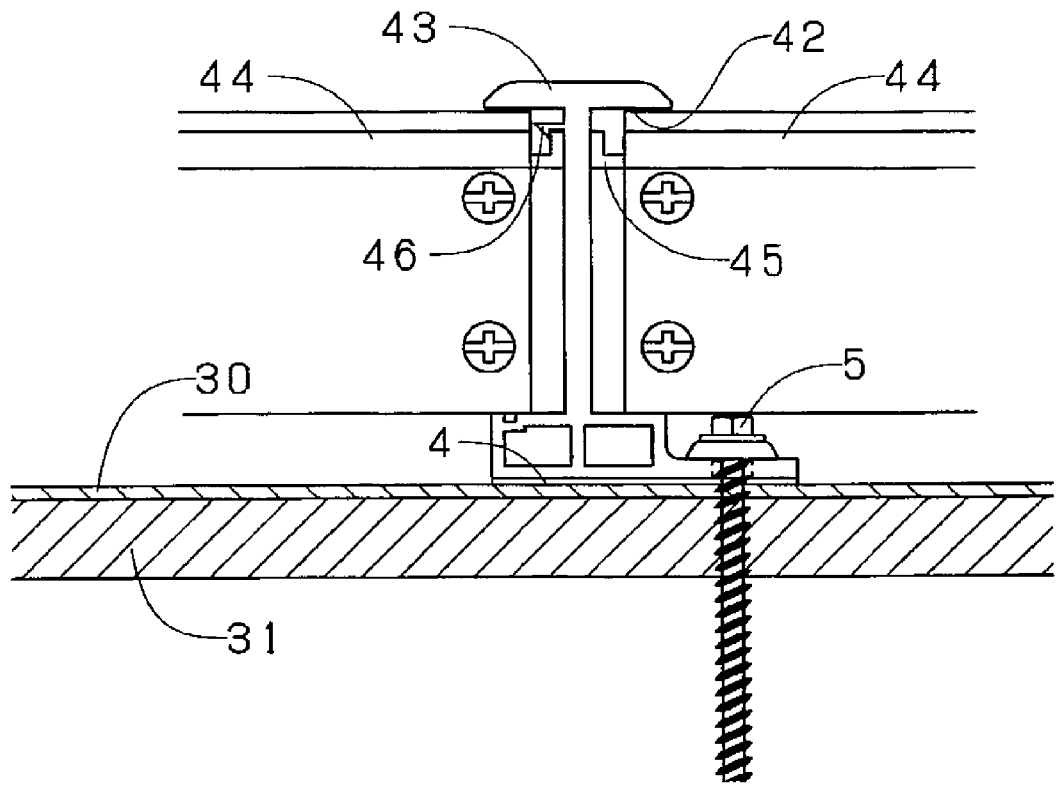
FIG. 12 is a sectional view used for explaining outline of another shape of a fixing member of the present invention.

A fixing member 43 shown in FIG. 12 may be used instead of the fixing members 3 and 40. With this, as shown in FIG. 12, in the conventional solar battery module formed with the engaging portion 45, engagement can be established by a to-be engaged portion 46 formed on the fixing member 43. With this, since the solar battery module 44 and the fixing member 43 are engaged with each other by the engaging portion 45 and the to-be engaged portion 46, the relative movement in the perpendicular direction can be restricted. As compared with the butt only, it is possible to prevent the solar battery module 44 from coming out due to the engagement even when force acting in the direction opposite from the butt is applied. Further, since the solar battery module frame body has the connecting portion 42 which connects the solar battery modules 44 which are adjacent to each other through the fixing member 43, the solar battery modules 44 can be disposed in a building. Further, the position of the fixing member 43 can freely be moved with respect to the solar battery module 44, the fixing member 43 can be slid to a position where there is the structure member 32 which supports the roofboard 31 at predetermined intervals, and the fixing member 43 can be mounted at that position.

The fixing member 43 has such a shape that the length of a T-shape of the fixing member 3 is adjusted so that the conventional solar battery module 44 can be sandwiched, and the fixing member 43 has a connecting portion 42. There is a solar battery module frame body having a pawl-shaped to-be engaged portion 46 at a location corresponding to the height of the engaging portion 45 of the conventional solar battery module 44 below the upper side of the T-shaped eaves side. A material of the fixing member 43 is an aluminum extrusion material, and its color is black.

Figure 13:
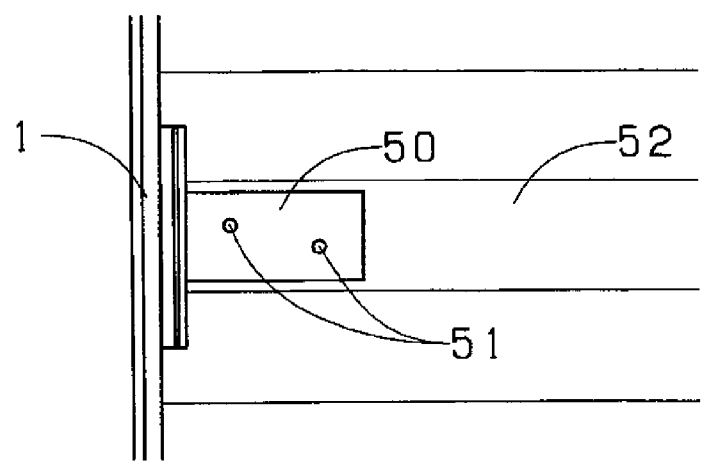
FIG. 13 is a plan view used for explaining outline of another shape of a fixing member of the present invention.

Further, the fixing member 3 may be a fixing member 50 as shown in FIG. 13. With this, as shown in FIG. 13, a portion the fixing member 50 facing the roof is made thin and long in the flowing direction of the roof as compared with the fixing member 3, the solar battery module frame body can be disposed in a building more strongly even with respect to a roofing 52 having a narrow lateral width. If a main body fixing screw hole 51 is deviated from a straight line with respect to the flowing direction of the roof, a crack of the structure member 32 which is generated when screws are arranged on fiber of the structure member 32 can be prevented.

Further, as shown in FIGS. 14 and 15, the main body fixing screw hole 25 of the fixing member 3 is not directly disposed on the roofing 30 while using the main body fixing screw 5 by adjusting the size of the main body fixing hole 54 like the fixing member 53, and the fixing member 53 can be fixed by a main body fixing bolt 55 utilizing fixing hardware 56 for example. With this, the solar battery module main body 9 can be disposed on the roofing 30 having waterproof function and fire protection function, and on the conventional roofing 57.

It is readily apparent that the above-described embodiments have the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. A solar battery module comprising:

polygonal a pair of solar battery panel main bodies adjacent to each other where one is a ridge-sided solar battery panel main body and the other is an eaves-sided solar battery panel main body;

a pair of first frame bodies that are adjacent to each other where one is a ridge-sided first frame body and the other is an eaves-sided first frame body, the ridge-sided first frame body configured to support an edge of the ridge-sided solar battery panel main body and the eaves-sided first frame body configured to support an edge of the eaves-sided solar battery panel main body, and each of the first frame bodies having a concave connecting portion positioned on a side surface opposite to another side surface for supporting the respective solar battery panel main bodies;

and a fixing member, which has a to-be connected portion that is insertable within the connecting portions of the first frame bodies and is capable of connecting said first frame bodies, so that upper sections of the first frame bodies supporting the respective solar battery panel main bodies are arranged adjacently and are made linearly symmetrical in cross-section, and is slidable along the first frame bodies, and is fixable to a roofboard by a main body fixing screw, and is also fixable to the respective solar battery panel main bodies through the respective first frame bodies, the fixing member having a laterally long rectangular shape and including a vertical cross piece as a reinforcing member at the center between upper and bottom sides inside the rectangular shape, and being formed with a main body fixing screw hole for being fixed to the roofboard at an extension extending from the bottom side to a ridge side of the rectangular shape of the fixing member below the ridge-sided solar battery panel main body.

2. The solar battery module according to claim 1, further comprising a movement-restricting means which restricts a relative movement between the eaves-sided first frame body and the fixing member in a direction perpendicular to a sliding direction of the fixing member.

3. The solar battery module according to claim 2, wherein the movement-restricting means comprises an engaging portion formed on the eaves-sided first frame body, and a to-be engaged portion formed on the fixing member.

4. The solar battery module according to claim 1, wherein a height of the fixing member can be adjusted by a height adjusting pedestal.

5. The solar battery module according to claim 1, further comprising a second frame body which supports a side that is different from the side supported by the first frame body of the solar battery module main body.

* * * * *